Patented Nov. 8, 1932

1,886,487

UNITED STATES PATENT OFFICE

HANS LEHRECKE, OF FRANKFORT-ON-THE-MAIN, GERMANY, ASSIGNOR TO DEUTSCHE GOLD & SILBER SCHEIDEANSTALT, VORMALS ROESSLER, OF FRANKFORT-ON-THE-MAIN, GERMANY, A CORPORATION

PROCESS FOR THE MANUFACTURE OF A MIXTURE OF HYDROCYANIC ACID WITH CYANOGEN CHLORIDE

No Drawing. Application filed May 20, 1927, Serial No. 193,071, and in Germany May 22, 1926.

This invention relates to the manufacture of a mixture of hydrocyanic acid with cyanogen chloride which latter acts as an irritating substance the mixture being particularly suitable for the use as a fumigant.

It has been known for a long time that hydrocyanic acid on account of its faint odor has been used in conjunction with warning or irritating substances. Mixtures of hydrocyanic acid with additions of this kind have been utilized above all when fumigating dwelling houses, flour mills and the like.

According to my present invention a mixture comprising hydrocyanic acid and an irritating substance is manufactured by generating the irritating substance in the hydrocyanic acid itself. In carrying out my invention I introduce chlorine in the form of gas into the concentrated liquid hydrocyanic acid. When the chlorine is passed into the liquid hydrocyanic acid cyanogen chloride is formed which is an excellent irritating substance and which for the practical purpose of fumigation has the special advantage of possessing a boiling point which is lower than that of hydrocyanic acid.

The chlorine is introduced advantageously in a fairly rapid stream whilst avoiding undue delay because decompositions may easily occur when chlorine is introduced too slowly. Furthermore, it is advantageous to cool the reaction mixture whilst passing in the chlorine. In order to remove hydrochloric acid which is generated during the introduction of the chlorine and the generation of the cyanogen chloride, the chlorine is introduced, for instance, in presence of such substances of a weakly alkaline reaction as are capable of combining with the hydrochloric acid. Substances of this kind are, for instance, oxides or hydroxides of metals or metallic earths, carbonates or bicarbonates or the like. Suitable substances are, for instance, aluminum oxide, zinc oxide, aluminum hydroxide, calcium carbonate, magnesium carbonate, sodium bicarbonate etc. Instead of introducing the chlorine in the presence of substances capable of combining with the hydrochloric acid formed the mixture of hydrocyanic acid and cyanogen chloride resulting from the introduction of chlorine may be subjected to a subsequent treatment with the substances afore-mentioned. This treatment may consist in shaking the liquid mixture with substances capable of combining with hydrochloric acid or with stirring these finely ground substances into the reaction mixture or a similar process.

Furthermore, I have found it useful to carry out my new process in the presence of small quantities of water. I have started, for instance, with advantage from a hydrocyanic acid which contains a small amount of water such as for instance 2 to 6%. Water may, however, be added subsequently, for instance, whilst the gaseous chlorine is passed into the concentrated HCN the quantity being as mentioned above e. g. 2 to 6%. The addition of water may take place, also, in conjunction with the substances combining with the hydrochloric acid, either before adding the latter or even immediately afterwards. I found it advantageous to add an excess of the substances capable of combining with hydrochloric acid such as for instance calcium carbonate. After having thoroughly mixed the solid substance or substances with the liquid reaction mixture of hydrogen cyanide and cyanogen chloride, the latter is separated in a suitable manner, for instance by decantation from the additional substances which have partly been converted and which are partly unchanged and may be either in a solid or a semi-liquid state. To the mixture of hydrogen cyanide and irritating substance thus produced stabilizing substances such as acids, acid substances or the like may be added, when desired.

Example

In order to produce a mixture of hydrocyanic acid and cyanogen chloride which contains approximately 5% cyanogen chloride 180 grammes of gaseous chlorine are passed into 3 kilogrammes of hydrogen cyanide of about 97%, taking care that the reaction mixture is well cooled. The gas is introduced in such a way that the total chlorine is passed into the mixture within not more than one hour. As soon as the chlorine has been added 200 grammes calcium carbonate are added with agitating. The reaction mixture is then allowed to settle and the liquid hydrogen cyanide-cyanogen chloride mixture is separated from the partly liquid partly solid residue collecting at the bottom of the vessel by drawing off. The mixture is now ready to be used for fumigation purposes, utilizing it either in the liquid state or absorbing it previously in porous substances such as for instance diatomite, kieselguhr, silica gel or the like.

What I claim is:

1. A process of manufacturing a mixture containing hydrocyanic acid and cyanogen chloride, which consists in introducing chlorine into liquid concentrated hydrocyanic acid at a rate above 60 grams of chlorine per kilogram of hydrocyanic acid per hour while cooling the solution and removing the hydrochloric acid formed by the reaction.

2. A process of manufacturing a mixture containing hydrocyanic acid and cyanogen chloride, which consists in introducing chlorine into liquid hydrocyanic acid containing small amounts of water with cooling at a rate above 60 grams of chlorine per kilogram of hydrocyanic acid per hour and removing the hydrochloric acid formed by the reaction.

3. A process for the manufacture of a mixture containing hydrocyanic acid and cyanogen chloride, which consists in introducing chlorine into concentrated liquid hydrocyanic acid at a rate above 60 grams of chlorine per kilogram of hydrocyanic acid per hour while cooling the solution and removing the hydrochloric acid formed by the reaction.

4. A process for the manufacture of a mixture containing hydrocyanic acid and cyanogen chloride, which consists in introducing chlorine into concentrated liquid hydrocyanic acid at a rate above 60 grams of chlorine per kilogram of hydrocyanic acid per hour while cooling the solution and removing the hydrochloric acid formed by the reaction by bringing the reaction mixture into contact with weakly alkaline substances capable of combining with hydrochloric acid.

5. A process for the manufacture of a mixture containing hydrocyanic acid and cyanogen chloride, which consists in introducing chlorine at a rate above 60 grams of chlorine per kilogram of hydrocyanic acid per hour into liquid hydrocyanic acid containing less than about 6% of water while cooling the solution and removing the hydrochloric acid formed by the reaction by the addition of weakly alkaline substances capable of combining with hydrochloric acid.

6. A process for the manufacture of a mixture containing hydrocyanic acid and cyanogen chloride, which consists in introducing chlorine at a rate above 60 grams of chlorine per kilogram of hydrocyanic acid per hour into concentrated hydrocyanic acid containing small amounts of water while cooling the solution and removing the hydrochloric acid formed by the reaction by bringing the reaction mixture into contact with calcium carbonate.

7. A process for the manufacture of a mixture containing hydrocyanic acid and cyanogen chloride, which consists in introducing chlorine at a rate above 60 grams of chlorine per kilogram of hydrocyanic acid per hour into concentrated liquid hydrocyanic acid containing small amounts of water while cooling the solution and removing the hydrochloric acid formed by the reaction by agitating the mixture resulting from the introduction of chlorine into liquid hydrocyanic acid with finely ground calcium carbonate.

8. A process for the manufacture of a mixture containing hydrocyanic acid and cyanogen chloride, which consists in passing chlorine at a rate above 60 grams of chlorine per kilogram of hydrocyanic acid per hour into liquid hydrocyanic acid of 94 to 98 per cent HCN while cooling the solution and agitating the reaction mixture with weakly alkaline substances capable of combining with hydrochloric acid.

9. A process for the manufacture of a mixture containing hydrocyanic acid and cyanogen chloride, which consists in introducing chlorine at a rate above 60 grams of chlorine per kilogram of hydrocyanic acid per hour into liquid concentrated hydrocyanic acid while cooling the solution bringing the reaction mixture in the presence of small quantities of water into contact with weakly alkaline substances capable of combining with hydrochloric acid and separating the liquid reaction mixture from the residue.

10. A process of manufacturing a liquid mixture of hydrocyanic acid and cyanogen chloride containing substantially less than 6 per cent of water which comprises passing chlorine into liquid concentrated hydrocyanic acid containing less than 6 per cent of water at a rate above 60 grams of chlorine per kilogram of hydrocyanic acid per hour while cooling the solution and removing the hydrochloric acid formed by the reaction.

11. A process of manufacturing a liquid mixture of hydrocyanic acid and cyanogen chloride containing substantially less than 6 per cent of water which comprises passing chlorine into liquid concentrated hydrocyanic acid containing less than 6 per cent of water at a rate above 60 grams of chlorine per kilogram of hydrocyanic acid per hour while cooling the solution, and removing the hydrochloric acid formed by the reaction by bringing the reaction mixture into contact with weakly alkaline substances capable of combining with hydrochloric acid.

12. A process for the production of a liquid mixture of hydrocyanic acid and cyanogen chloride containing substantially less than 6% of water which comprises passing chlorine into liquid concentrated hydrocyanic acid containing less than 6% of water at a rate sufficient to prevent decomposition of the hydrocyanic acid and cyanogen chloride formed and while cooling the solution.

13. A process of manufacturing a liquid mixture of hydrocyanic acid and cyanogen chloride which consists in passing chlorine into a liquid containing more than 94% of hydrocyanic acid while cooling the liquid.

Signed at Frankfort-on-the-Main this 6th day of May A. D. 1927.

HANS LEHRECKE.